July 1, 1952

J. S. BAKER

2,602,111

ALTITUDE WARNING SIGNAL SYSTEM

Filed Sept. 28, 1948

INVENTOR.
John S. Baker
BY
Attys

July 1, 1952 J. S. BAKER 2,602,111
ALTITUDE WARNING SIGNAL SYSTEM
Filed Sept. 28, 1948 2 SHEETS—SHEET 2

INVENTOR.
John S. Baker
BY
Thum, Olun & Macklinburger
Attys

Patented July 1, 1952

2,602,111

UNITED STATES PATENT OFFICE 2,602,111

ALTITUDE WARNING SIGNAL SYSTEM

John S. Baker, Chicago, Ill., assignor to Cook Electric Company, Chicago, Ill., a corporation of Illinois Application September 28, 1948, Serial No. 51,545

13 Claims. (Cl. 177—311)

This invention relates to a new and improved altitude warning signal system for aircraft and the like.

Increasing speeds of certain types of aircraft make it desirable, if not essential, to warn the pilot automatically when predetermined altitude levels are reached. The velocity at which these ships travel causes high altitude levels to be reached quickly, and the safety of the pilot may be endangered unless a signal is provided to assure that he will be advised upon reaching the high altitude level at which, for example, oxygen becomes necessary for sustained flight, or the high altitude level representing the maximum service ceiling of the aircraft.

Accordingly, it is an object of the invention to provide a new warning signal system capable of energizing a signal at a predetermined altitude level, and, although the signal may be deenergized after the pilot has received the proper warning, it will again be energized if the plane goes to and above a higher predetermined altitude level where another warning is desirable, or goes below either level and returns to and goes above the same again.

A still further object of the invention is to provide an altitude warning signal system capable of accurate operation and which will not be disturbed by flight vibration to which it will be subjected.

A still further object of the invention is to provide a warning signal system that is simple and has a minimum number of parts.

Other objects and advantages will be apparent from the following detailed description when taken in connection with the accompanying drawings which form a part hereof.

Figure 1:
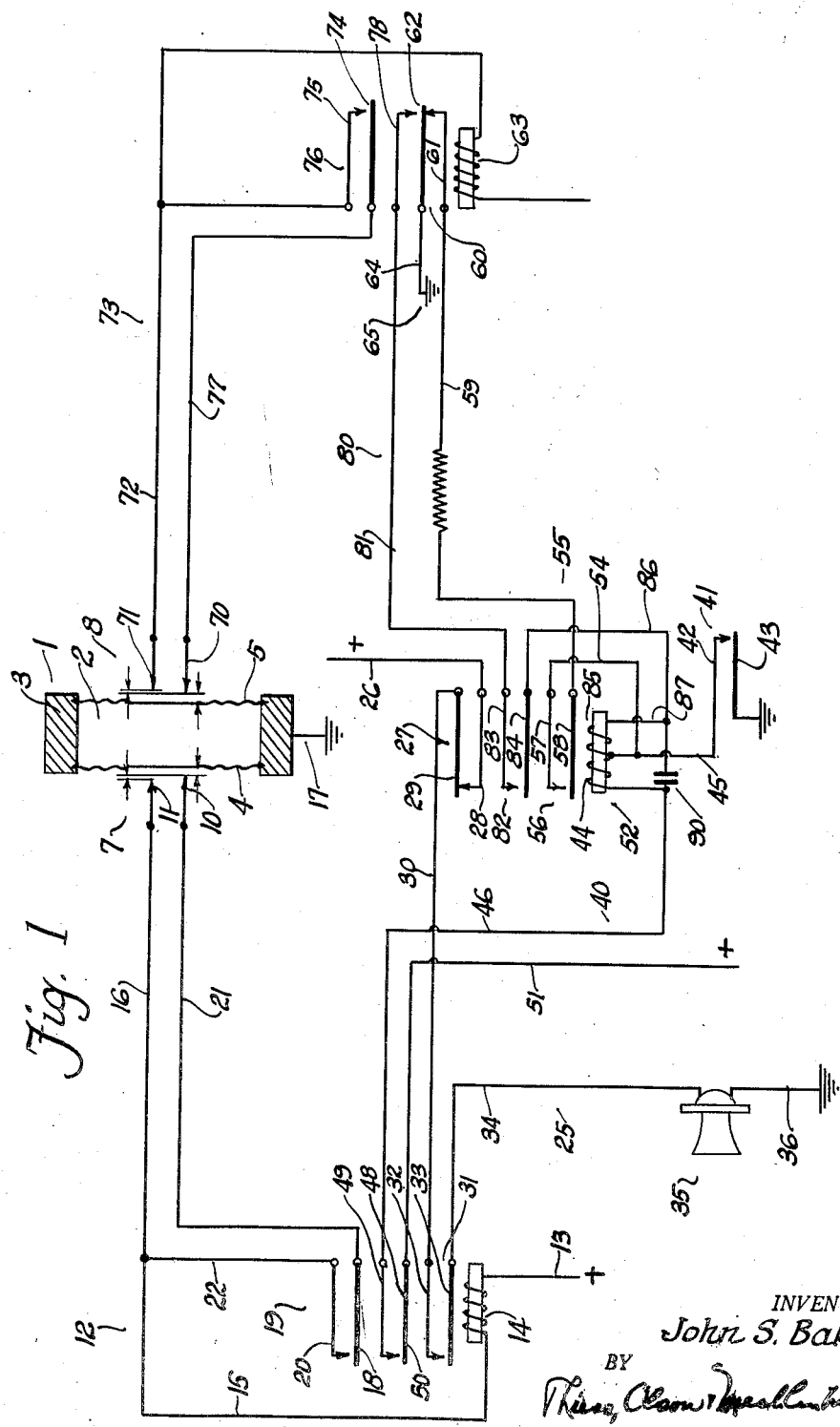
Figure 1 is a wiring diagram illustrating one embodiment of the invention.

The illustration in Fig. 1 includes a novel type of aneroid switch 1 adapted to close at a plurality of altitude levels and to energize a series of circuits to effect operation of a signal designated broadly as 35. Although this aneroid may be constructed in any preferred way, it is shown as having an annular housing 3 with opposed flexible walls 4 and 5 forming a chamber 2 which is evacuated so that a lowering of atmospheric pressure will cause walls 4 and 5 to flex outwardly and engage the contacts of switches 7 and 8. Switches 7 and 8 each have a set of novelly spaced contacts, designated 10 and 11 and 70 and 71, respectively, arranged with respect to walls 4 and 5 so that these walls will engage contacts 10 and 70 before engaging contacts 11 and 71. While the spacing between these walls and these contacts may be adjustable in order that switches 7 and 8 may be closed at different altitude levels if so desired, the arrangement shown in Fig. 1 contemplates switch 7 closing, for example, at ten thousand feet altitude, and switch 8 closing at forty thousand feet altitude. Switch 7 has its contacts 10 and 11 in an actuating circuit 12 that includes an actuating relay coil 14. When wall 4 initially flexes outwardly, it will first be brought into a somewhat fluttering engagement with contact 10. Due to vibration and this somewhat fluttering action of wall 4, the engagement will be made and broken a number of times before the outward flexing will reach a stage causing the wall to press firmly against contact 10 and keep the engagement closed.

Thereafter, wall 4 will initially engage contact 11. The first surge of current will be through wire 13, relay 14, wires 15 and 16, contact 11, wall 4 and to ground through return connection at 17. Immediately, actuating relay 14 is energized and contact 20 of switch 19 engages spring 18. This closes the circuit which includes wires 21 and 22 and contact 10. This circuit functions as a holding circuit for relay 14 to keep it energized after the first impulse of current through relay 14. Without this arrangement it will be apparent that the initial fluttering engagement of wall 4 with contact 10 would cause a repeated make and break of the relay circuit, and consequently, a chattering at relay 14 until the wall 4 moves far enough to firmly press against contact 10. By having an open circuit initially for contact 10, the fluttering action of the wall 4 as it flexes outwardly is ineffective and engagement is completed only after further flexing of wall 4 causes a firm contact between the wall and contact 10. Thereafter a single touch of wall 4 with contact 11 energizes relay 14 sufficiently long, although the action is almost instantaneous, to cause a lock-up of relay 14 through switch 19.

A single circuit 25 comprises a wire 26, a switch 27 having a contact 28 and a contact spring 29, a wire 30, a switch 31 having a contact 32 and a contact spring 33, a wire 34, signal 35 and return line 36. The arrangement is preferably such that switch 27 is normally closed and switch 31 is normally opened. Hence, when switch 31 is closed by the actuation of relay 14, the signal circuit 25 is closed and the signal element 35, whether audible or visual, will be actuated. If aneroid 2 is calibrated to close switch 7, say at a ten thousand feet altitude, signal 35 will immediately operate and warn the pilot or other attendant that the aircraft has reached and is passing beyond this altitude level.

To effect a termination or cut-out of the signal 35, a cut-out circuit 40 is provided. This cut-out circuit 40 comprises a switch 41 having contacts 42 and 43, wire 45, a portion of coil designated 44 of a control relay 52, wire 46, contact 49 of switch 48, contact spring 50 and wire 51. When relay 14 is energized by the closing of actuating circuit 12 at aneroid 1, switch 48 is also closed, the signal circuit 25 also is closed and signal 35 is actuated. It will remain actuated until cut-out circuit 40 is closed at switch 41, which actuates relay 52 and opens switch 27. Immediately, the signal circuit is opened and the signal 35 is stopped.

In order to keep signal circuit 25 deenergized after switch 41 is actuated, which is preferably of the push-button type, a holding circuit 55 is provided for coil 44 of relay 52. This holding circuit 55 includes a wire 54 and a switch 56 having a contact spring 58 and a contact 57. It also includes wire 59, switch 60 having a contact 61 and a contact spring 62, which normally engage each other when relay 63 is deenergized. Contact spring 62 is connected by wire 64 to ground connection 65. Consequently, a mere touch of the release or cut-out switch 41 by the pilot will promptly open signal circuit 25 and switch 27, and this switch 27 will be held opened by holding circuit 55 keeping coil 44 of relay 52 energized. This condition continues as long as aneroid 1 keeps actuating circuit 12 closed at switch 7. When aneroid 1 opens switch 7, as will be the case if the plane drops below the level at which aneroid 1 is calibrated to close switch 7, relay 14 is immediately deenergized and all of the switches 16, 31, 48 are opened. Coil 44 of relay 52 is then deenergized and the holding circuit 55 is broken. Switch 27 then closes, but the signal circuit 25 includes switch 31 which opens when relay 14 of actuating circuit 12 is deenergized. However, if the plane again crosses the altitude level at which aneroid 1 is calibrated to close switch 7, switch 31 will be immediately closed and signal 35 actuated. It will continue to signal the plane's ascent above this predetermined altitude level until switch 41 is actuated.

A second setting for aneroid 1 is represented by switch 8, which may be similar in construction and operation to switch 7. It includes contacts 70 and 71 arranged in spaced relation so that contact 70 is engaged by wall 5 before contact 71. When contact 71 is finally engaged by wall 5, the latter will be in firm contact with contact 70, and hence, the first surge of current through wire 72 of actuating circuit 73 will energize relay 63 and close the contacts 74 and 75 of switch 76. Contact 74 connects with contact 70 by means of wire 77. Switch 60 also includes contact 78 which normally is open but which engages contact spring 62 when relay 63 is energized.

It will be presumed that the setting of aneroid 1 represented by switch 8 is for a greater altitude level than the setting represented by switch 7. Consequently, when switch 8 is closed by aneroid 1, coil 44 will be energized because switch 7 will be closed and relay 14 will be held energized. Contact 78 is connected in a second holding circuit for relay 52. This second holding circuit is designated 80 and includes a wire 81, a switch 82 having a contact 83 and a spring contact 84 which connects to coil 85 of relay 52 by means of wires 86 and 87. When aneroid 1 closes switch 8, actuation of relay 63 opens switch 60 at contact 61 and closes it at contact 78. During the break and make period, the first holding circuit 55 for relay 52 is opened and coil 44 of relay 52 is immediately deenergized. Switch 27 is, therefore, allowed to close and the signal circuit 25 is energized to actuate signal 35. Signal 35 will remain actuated until deenergized by cut-out circuit 51 through the closing of switch 41. Instead of the current flowing through coil 44 only of relay 52, it will now flow through both coils 44 and 85, wire 87, wire 86, closed switch 82, wire 81, contact 78, contact spring 62, wire 64 and return connection 65. Relay 52 will, therefore, remain locked in actuated position to hold switch 27 open in order to keep signal 35 deenergized.

If it is assumed, for purposes of illustration only, that switch 7 will be closed at an altitude level of ten thousand feet and switch 8 will be closed at an altitude level of forty thousand feet, signal 35 will be energized when switch 7 is closed and will remain closed at and above this level until deenergized by a momentary closing of switch 41. Signal 35 will then remain inactive until one of two conditions obtain. First, it will close again if the plane should first drop below ten thousand feet and again rise to and above this level. Second, after it is deenergized by operation of switch 41, it will close again if the plane rises above forty thousand feet.

Provision has been made in the form of condenser 90 bridged across coils 44 and 85 to prevent relay 52 being deenergized when contact 62 moves from contact 78 to contact 61 upon deenergization of relay 63. Thus, switch 27 is held open and signal 35 is prevented from operation at this time. The current stored up in this condenser 90 will be adequate to maintain coils 44 and 85 energized long enough to prevent relay 52 from being deenergized before holding circuit 55 is established by contact 62 moving into engagement with contact 61.

Figure 2:
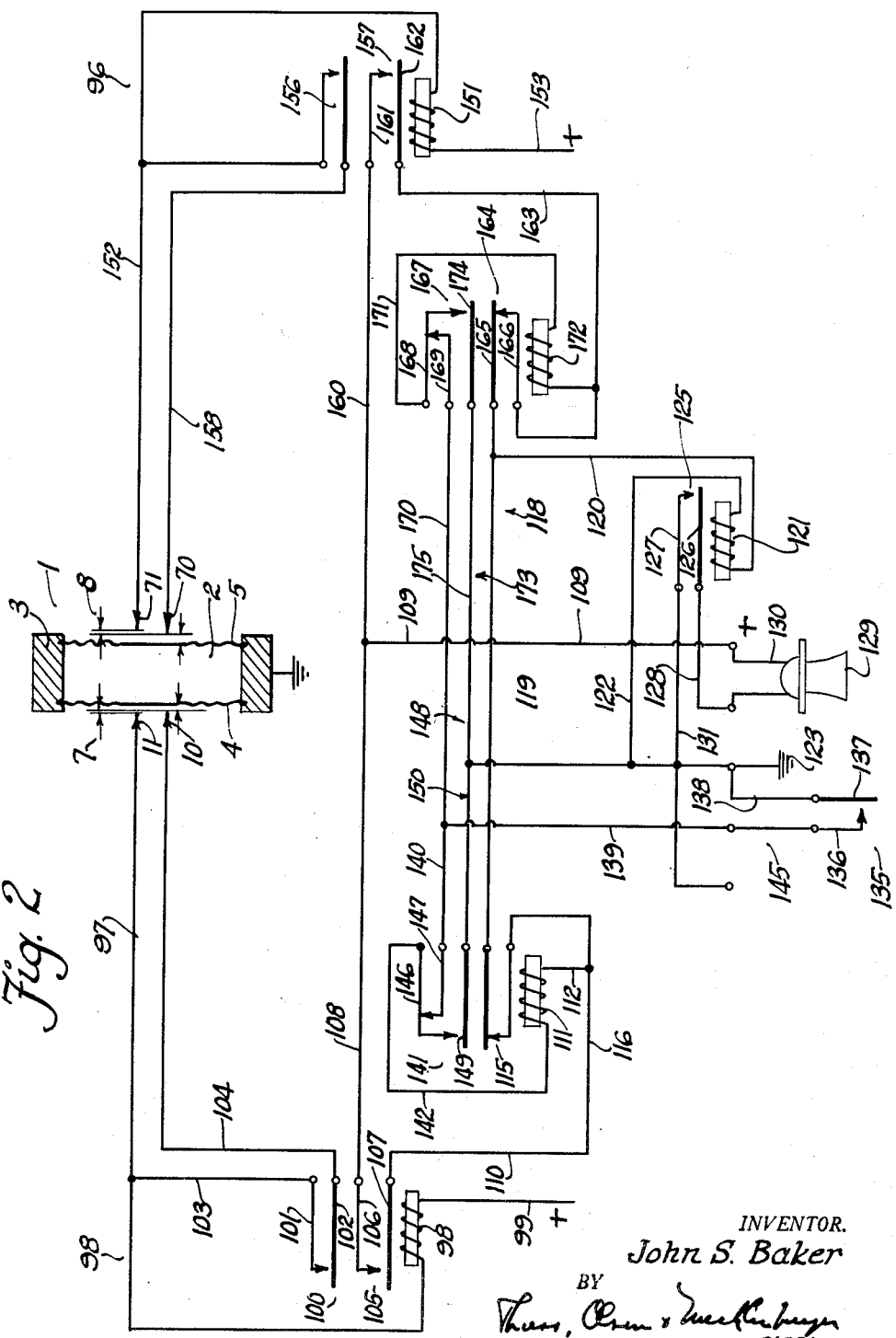
Fig. 2 is a wiring diagram illustrating another embodiment of the invention.

Fig. 2 illustrates a modified structure. Again, aneroid 1 is provided with switches 7 and 8 having contacts 10 and 11 and 70 and 71 respectively in holding circuits 95 and 96, switch 7 being arranged for closing at a lower altitude level than switch 8. As previously, contact 11 connects by a wire 97 to relay 98 having a return connection 99. Operation of relay 98 closes switch 100 having a contact spring 101 and a contact 102. Switch 100 with wires 103 and 104 constitutes a holding circuit for relay 98 when wall 4 of aneroid 1 first firmly engages contact 10 and then contact 11. Relay 98 also closes switch 105 having contact 106 and a contact spring 107. Switch 105 is connected by wires 108 and 109 to one side of the line while wire 110 connects it to a relay 111 by a wire 112 and to a normally closed switch 115 by a wire 116. Switch 115 is included in a signal circuit 118 by a wire 119, a wire 120, a relay 121, a wire 122 and return connection 123. Signal circuit 118 also includes a normal open switch 125 having its contacts 126 and 127 closed when relay 121 is actuated. Contact 126 connects by a wire 128 to a signal 129 connected at its other terminal to wire 130 shown connected to the positive side of the current supply. Contact 127 is connected by a wire 131 to the return side 123 of the line. Consequently, when switch 7 is closed by aneroid 1 and actuating circuit 95 is closed to energize relay 98, the current will flow from the positive side illustrated at 130 through wire 109, wire 108, closed switch 105, wires 110 and 116, normally closed switch 115, wires 119 and 120, relay 121, wire 122 and return side 123. Immediately, switch 125 is closed and current will flow from 130 through signal 129, wire 128, switch 125, wire 131 and return side 123. Signal 129 will continue to operate until its circuit is opened by deenergizing relay 121.

Relay 121 is deenergized by the closing of a switch 135 having contacts 136 and 137. Contact 137 is connected to the return side 123 of the line by a wire 138. Contact 136 is connected by a wire 139 to wire 140. Wire 140 is connected to a normally closed switch 141 which is connected by wire 142 to relay 111. The current will flow in this cut-out circuit designated 145 first from wire 109, wire 108, closed switch 105, wires 110 and 112, relay 111, wire 142, normally closed contacts 146 and 47, wires 140 and 139, switch 135 and wire 38 to return side 123. With relay 111 actuated, signal circuit 118 is broken at switch 115 which is then opened while a holding circuit 148 is closed at switch 141 by its contact 149 moving upwardly to engage contact 146 and lift it out of engagement with contact 147.

The current will flow through holding circuit 148 first through wire 109, then wire 108, closed switch 105, wires 110 and 112, relay 111, wire 142, contacts 146 and 149, wire 150 and return side 123. This holding circuit 148 will continue to persist and keep relay 111 energized in order to hold switch 115 open, and consequently, to hold coil 121 deenergized and switch 125 opened. While coil 121 is deenergized and switch 125 is held opened, signal 129 cannot operate. If, however, the aircraft should drop below the predetermined altitude level at which switch 7 is closed by aneroid 1, actuating circuit 95 is opened and relay 98 is deenergized. Switch 105 is then opened, which deenergizes relay 111 and resets switches 115 and 141 so that upon a return of the plane to this altitude level, the system will be reestablished and will function to operate signal 129 again.

If the plane should ascend to the second altitude level at which aneroid 1 will close switch 8, actuating circuit 96 will be closed and relay 151 will be energized. The operation of switch 8 is the same as switch 7. Contact 70 will be first engaged by wall 5. Any fluttering engagement will not complete the circuit. When the engagement is firmly made, wall 5 will have flexed outwardly far enough to engage contact 71. This will cause the current to flow momentarily through wire 152, coil 151 and wire 153. Actuation of relay 151 closes switches 156 and 157, the former to establish a holding circuit 158 for relay 151 and the latter to close the alarm circuit, which now includes wire 109, wire 160, switch 157 having contacts 161 and 162, wire 163, normally closed switch 164 having contacts 165 and 166, wire 120, relay 121, wire 122 and return connection 123. Again switch 125 will close to actuate signal 129.

A switch 167, similar to switch 141, with normally closed contacts 168 and 169, is provided in circuit with cut-out circuit 139 by means of wire 170 and a wire 171 leading from contacts 168 to relay 172. After signal circuit 118 is closed by the closing of switch 157, actuation of switch 135 of cut-out circuit 139 causes current to flow through relay 172. Switch 164 is then opened and signal circuit 118 is deenergized.

A holding circuit 173 is established by means of movable contact 174 of switch 167 engaging contact 168 and then lifting it from contact 174. The current will then flow from contact 168 through contact 174, wire 175 and return to 123. This condition obtains as long as the plane is at or above the altitude level represented by the closing of switch 8. As soon as the plane drops below this predetermined level, switch 8 will open and remain open unless the plane again ascends to this predetermined level. If the plane does so ascend, the alarm 129 will again function and require operation of switch 135 before it will be stopped. As previously stated, signal 129 may be an audible alarm or instrument carrying a lamp which will light and be visible when the signal circuit is closed.

It will be observed from the foregoing description that an altitude warning signal system has been provided which will operate a warning signal at a plurality of altitude levels as a plane ascends to these levels and which signal requires deenergization each time and remains deenergized until the plane enters one of the higher altitude levels or descends and reenters any one of these levels. The system is extremely accurate and sensitive so as to assure operation of the signal each time it is required. The aneroid and its circuit making parts also assure accuracy in operation because flight vibration or jarring will not hinder the movement of the switch parts.

Without further elaboration, the foregoing will so fully explain the gist of my invention that others may, by applying current knowledge, readily adapt the same for use under varying conditions of service, without eliminating certain features, which may properly be said to constitute the essential items of novelty involved, which items are intended to be defined and secured to me by the following claims.

I claim:

1. In an altitude warning signal system, the combination of an actuating electric circuit having a circuit closing aneroid and an actuating device therein, two contacts engageable by said aneroid, one of said contacts being directly connected in said actuating circuit and the other said contact being connected in said actuating circuit through a circuit making and breaking unit controlled by said actuating device to provide a holding circuit for said actuating device when the first mentioned contact is engaged by said aneroid, a signaling circuit closed by said actuating device and a cut-out circuit for said signaling circuit, and a control device for opening said signaling circuit when said cut-out circuit is closed.

2. In an altitude warning signal system, the combination of an aneroid operable at a plurality of altitude levels, an actuating electric circuit for each of two predetermined levels and a circuit making and breaking unit in each actuating circuit to close the circuit upon an ascent of said aneroid beyond said predetermined altitude levels and remain closed above said predetermined altitude levels, an actuating relay for each actuating circuit, a signaling circuit common to both actuating circuits and operable by their said actuating devices, a cut-out circuit for said signaling circuit, and a control device energizable by said cut-out circuit to open said signaling circuit.

3. In an altitude warning signal system, the combination of an aneroid operable at a plurality of altitude levels, an actuating electric circuit for each level to be closed at said level and remain closed above said level and a circuit making and breaking unit in each actuating circuit to close the circuit upon an ascent of said aneroid beyond predetermined altitude levels, a signaling circuit common to both actuating circuits and operable by the closing of said actuating circuits by said circuit making and breaking units, a cut-out circuit for said signaling circuit, and a control device energizable by said cut-out circuit to open said signaling circuit.

4. In an altitude warning signal system, the combination of an aneroid operable at a plurality of altitude levels, an actuating electric circuit for each of two predetermined levels and a circuit making and breaking unit in each actuating circuit to close the circuit upon an ascent of said aneroid beyond said predetermined altitude levels and to remain closed above said levels, a signaling circuit common to both actuating circuits and operable by the closing of said actuating circuits by said circuit making and breaking units, a cut-out circuit for said signaling circuit, a control device energizable by said cut-out circuit to open said signaling circuit, and holding circuits controlled by said actuating circuits for keeping said control device actuated and said signaling circuit open.

5. In an altitude warning signal system, the combination of an aneroid operable at a plurality of altitude levels, an actuating electric circuit for each of two predetermined levels and a circuit making and breaking unit in each actuating circuit to close the circuit upon an ascent of said aneroid beyond said predetermined altitude levels and to maintain said circuits closed above said levels, a signaling circuit common to both actuating circuits and operable by the closing of said actuating circuits by said circuit making and breaking units, means for opening said signaling circuit, and means for keeping said opening means actuated while said actuating circuits are closed.

6. In an altitude warning signal system, the combination of an aneroid operable at a plurality of altitude levels, an actuating electric circuit for each of two predetermined levels and a circuit making and breaking unit in each actuating circuit to close the circuit upon an ascent of said aneroid beyond said predetermined altitude levels, a signaling circuit common to both actuating circuits and operable by the closing of said actuating circuits, a relay for opening said signaling circuit, and a capacitance in parallel with said relay adapted to maintain actuation of said relay as the aneroid descends below the upper of said two predetermined altitudes.

7. In an altitude warning signal system, the combination of an aneroid operable at a plurality of altitude levels, a relay for each altitude level adapted to be actuated by the ascent of said aneroid to said altitude levels, a signaling circuit closed by the actuation of any of said relays, a manually operable relay for opening said signaling circuit, and holding circuits controlled by said first relays for holding said signaling circuit open when opened by said manually operable relay.

8. In an altitude warning signal system, the combination of an aneroid operable at a plurality of altitude levels, an actuating circuit for each altitude level adapted to be closed by the ascent of said aneroid to said altitude levels and to remain closed above said altitude levels, a signaling circuit, an operating circuit associated with and operated by each of said actuating circuits and adapted to close said signaling circuit when either or all of said actuating circuits are closed, and a manually operated cut-out circuit for said operating circuits including control devices energizable when said cut-out circuit is closed to open said operating circuits.

9. In an altitude warning signal system, the combination of an aneroid operable at a plurality of altitude levels, an actuating circuit for each altitude level adapted to be closed by the ascent of said aneroid to said altitude levels, a signaling circuit, operating circuits adapted to close said signaling circuit when either or all of said actuating circuits are closed, a cut-out circuit for each operating circuit, a control device adapted to open said signalling circuit, and a holding circuit therefor for each cut-out circuit, said control device being energized by the closing of the cut-out circuit and remaining closed until opened by one of the actuating circuits.

10. In an altitude warning signal system including an aneroid, the combination of an actuating electric circuit having a circuit closing device including a plurality of contacts adapted to be closed by the ascent of said aneroid beyond a predetermined altitude level, an actuating relay in said circuit, a plurality of switches adapted to be closed by said relay when said actuating circuit is closed by said circuit closing device, a signal circuit having one of said switches therein adapted to be closed by said actuating relay, a cut-out circuit having another of said switches therein also adapted to be closed by said actuating relay, a holding circuit having contacts closed by said aneroid at an altitude below said predetermined altitude also having another of said switches in circuit with said contacts closed by said aneroid adapted to be closed by said actuating relay to hold said actuating circuit closed, a control relay in said cut-out circuit, and a normally closed switch in said signal circuit adapted to be opened to open said signal circuit when said control relay is energized.

11. In an altitude warning signal system including an aneroid, the combination of an actuating electric circuit having a circuit closing device including a plurality of contacts adapted to be closed by the ascent of said aneroid beyond a predetermined altitude level, an actuating relay in said circuit, a plurality of switches adapted to be closed by said relay when said actuating circuit is closed by said circuit closing device, a signal circuit having one of said switches therein adapted to be closed by said actuating relay, a cut-out circuit having another of said switches therein also adapted to be closed by said actuating relay, a holding circuit having contacts closed by said aneroid at an altitude below said predetermined altitude also having another of said switches in circuit with said contacts closed by said aneroid adapted to be closed by said actuating relay to hold said actuating circuit closed, a control relay in said cut-out circuit, a normally closed switch in said signal circuit adapted to be opened to open said signal circuit when said control relay is energized, a holding circuit for said control relay, and a switch adapted to be closed by said control relay to hold said control relay closed as long as said switch in said cut-out circuit is held closed by said actuating relay.

12. In an altitude warning signal system including an aneroid, the combination of an actuating electric circuit having a circuit closing device adapted to be closed by the ascent of said aneroid beyond a predetermined low altitude level, an actuating relay in said circuit, a plurality of switches adapted to be closed by said relay when said actuating circuit is closed by said circuit closing device, a signal circuit having one of said switches therein adapted to be closed by said actuating relay, a cut-out circuit having another of said switches therein also adapted to be closed by said actuating relay, a holding circuit also having another of said switches therein adapted to be closed by said actuating relay to hold said actuating circuit closed, a control relay in said cut-out circuit a normally closed switch in said signal circuit adapted to be opened to open said signal circuit when said control relay is energized, a holding circuit for said control relay, a switch adapted to be closed by said control relay to hold said control relay closed as long as said switch in said cut-out circuit is held closed by said actuating relay, a second actuating electric circuit having a circuit closing device adapted after said first actuating circuit is closed to be closed by the ascent of said aneroid beyond a predetermined high level, a second actuating relay, a second set of switches, said second set of switches being actuable by said second actuating relay, a second holding circuit for said control relay having one of the last said switches therein, said switches having a contact in said first holding circuit and a contact in said second holding circuit, the movement of said switch from said contact in said first holding circuit to said second holding circuit de-energizing said control device and closing said signal circuit until said cut-out circuit is again closed or said second actuating circuit is opened at said aneroid, said first actuating circuit remaining closed to keep said signal circuit closed if not opened by said cut-out circuit before said second actuating circuit is opened.

13. In an altitude warning signal system, the combination of an aneroid operable at a plurality of altitude levels, an actuating circuit for each of two predetermined levels and a circuit making and breaking unit in each actuating circuit to close the circuit upon an ascent of said aneroid beyond said predetermined altitude levels, a signal circuit common to both actuating circuits and operable by the closing of said actuating circuits, a relay having two energizing series connected windings for opening said signaling circuit, the first of said windings energizable above the lower of said predetermined altitude levels, and both of said windings energizable above the upper of said altitude levels, holding means for keeping said relay energized while said actuating circuits are closed, and capacitance means in parallel with said windings of a magnitude to maintain actuation of said relay as the aneroid descends below the upper of said predetermined altitude levels.

JOHN S. BAKER.

REFERENCES CITED

The following references are of record in the file of this patent:

UNITED STATES PATENTS

| Number | Name | Date |
| --- | --- | --- |
| 2,127,343 | Parlett | Aug. 16, 1938 |
| 2,275,883 | Bany | Mar. 10, 1939 |
| 2,439,474 | Kennelly | Apr. 13, 1948 |
| 2,447,625 | Astin | Aug. 24, 1948 |
| 2,461,075 | Naylor | Feb. 8, 1949 |
| 2,493,548 | Proctor | Jan. 3, 1950 |
| 2,501,793 | Sperry | Mar. 28, 1950 |

FOREIGN PATENTS

| Number | Country | Date |
| --- | --- | --- |
| 601,058 | Great Britain | Apr. 27, 1948 |

OTHER REFERENCES

Pages 1202 and 1203 of Electrical World, vol. 89, No. 23.

Page 164 of Kinks.